(No Model.)
G. C. GREEN.
SCOOTER AND SHOVEL PLOW.
No. 457,047.   Patented Aug. 4, 1891.
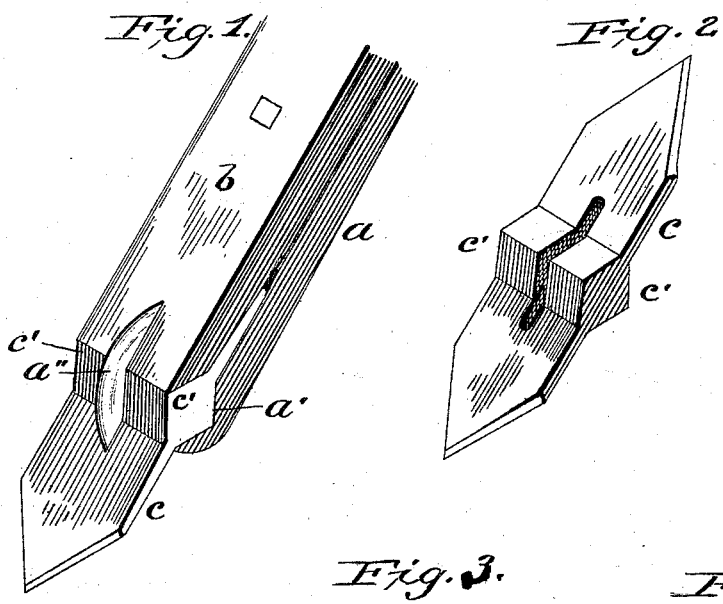
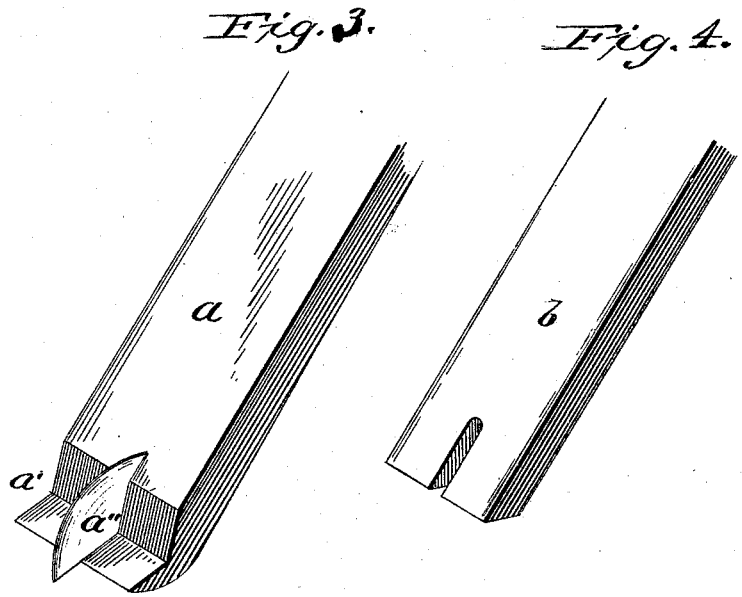

UNITED STATES PATENT OFFICE.

GEORGE C. GREEN, OF PRIOR'S, GEORGIA.

SCOOTER AND SHOVEL-PLOW.

SPECIFICATION forming part of Letters Patent No. 457,047, dated August 4, 1891.

Application filed April 1, 1891. Serial No. 387,279. (No model.)

*To all whom it may concern:*

Be it known that I, GEORGE C. GREEN, a citizen of the United States, residing at Prior's, in the county of Polk and State of Georgia, have invented certain new and useful Improvements in Scooters and Shovel-Plows, of which the following is a specification, reference being had therein to the accompanying drawings, in which—

Figure 1 represents a perspective view of my improved shovel-plow attached to its holder or standard; Fig. 2, a detail perspective view of the shovel or plow; Fig. 3, a similar view of the lower end of the plow standard or holder, and Fig. 4 a similar view of the lower end of the clamping-bar carried by the standard.

The invention is designed to provide an improved reversible scooter and shovel or point for shovel-plows; and it consists of certain new and useful combinations of parts, that will be fully hereinafter described, and particularly pointed out in the claims appended.

In the accompanying drawings, $a$ designates the standard, which may be attached in any suitable manner to the ordinary plow-stock, and which has formed across its lower end, in its upper or front side, a V-shaped depression $a'$. Formed on or secured to the front side of the standard near or at its lower end is a cutter $a''$, which projects from the face of the standard a suitable distance and extends longitudinally of the same and has its cutting-edge convexed or curved. The shovel $c$ is double-pointed and reversible, and it has formed across both its faces or sides about midway its length the transverse angular or V-shaped flanges $c'$ $c'$, either of which fits in the transverse depression $a'$ in the standard when the shovel is attached thereto and serves to prevent the shovel slipping and working loose while at work. By forming the flanges upon both sides and providing the shovel with points at both ends either end or side may be employed, thereby enabling the shovel to be employed until almost entirely worn out upon both sides and ends. To hold the shovel upon the standard and protect the upper unused end of the same is employed a clamping plate or bar $b$, which is the same width as the standard, and which is bolted to the front face thereof, its lower portion extending down over the upper point of the shovel and its lower beveled end abutting against and coming flush with the V flange upon the front face of the shovel. The shovel and the lower end of the clamping-bar are slotted longitudinally for the passage of the curved cutter, which, when the parts are secured together, projects from the face of the shovel a suitable distance and presents a curved cutting-edge, which serves to sever the weeds and roots encountered by the plow. Besides serving to cut roots, &c., the cutter also assists in locking the parts together and preventing vibration and loosening, as is evident.

Having thus fully described my invention, what I claim, and desire to secure by Letters Patent, is—

1. The combination of a standard provided with a groove across its lower end, a reversible double-pointed shovel provided with transverse flanges $c'$ across each of its faces about midway its length, these flanges adapted to rest one at a time in the said groove in the standard, and a clamping-plate having its lower end extending down over the upper end of the shovel, as and for the purpose described.

2. The combination, with a standard provided with a longitudinal cutter at its lower end projecting forwardly therefrom, of a shovel clamped to the said standard and provided with a slot through which the said cutter extends, substantially as and for the purpose described.

3. The combination of a standard grooved transversely at its lower end and provided with a forwardly-projecting cutter, a double-pointed shovel slotted for the passage of the said cutter and provided with a transverse flange upon one or both of its faces, and a clamping-plate secured to the said standard and overlapping the upper end of said shovel, substantially as and for the purpose set forth.

In testimony whereof I affix my signature in presence of two witnesses.

GEORGE C. GREEN.

Witnesses:
G. A. LANE,
S. ELLIS AYERS.